M. M. GOLDBERG.
SPEED TRANSFORMER.
APPLICATION FILED JULY 10, 1915.
1,303,291.
Patented May 13, 1919.
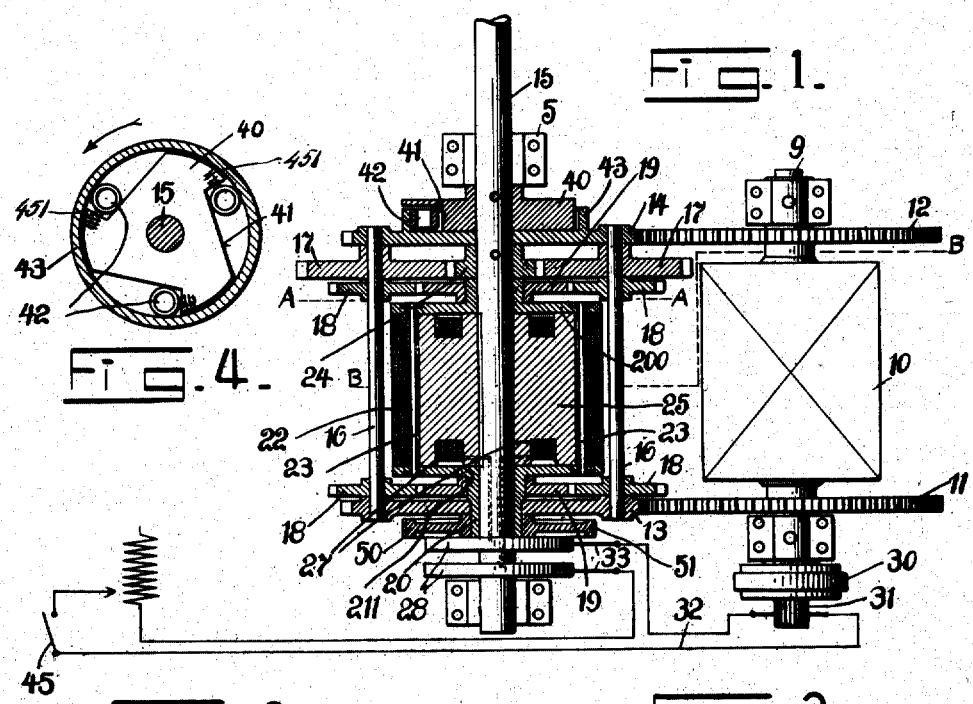
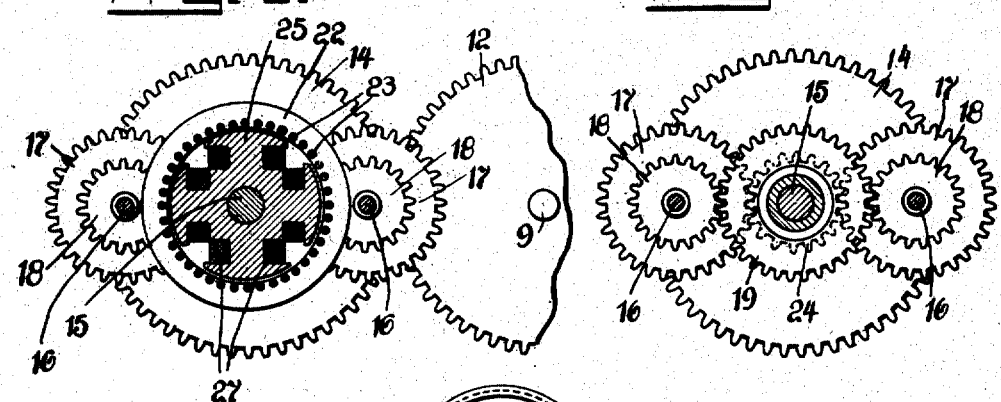
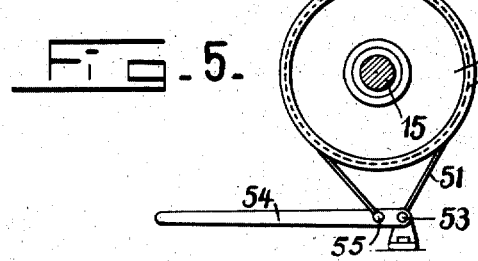
Inventor
Maximilian M. Goldberg.
By Harry W. Lindsey Jr.
Attorney

UNITED STATES PATENT OFFICE.

MAXIMILIAN M. GOLDBERG, OF DAYTON, OHIO.

SPEED-TRANSFORMER.

1,303,291.  Specification of Letters Patent.  Patented May 13, 1919.

Application filed July 10, 1915. Serial No. 39,096.

*To all whom it may concern:*

Be it known that I, MAXIMILIAN M. GOLDBERG, a citizen of the United States, residing at 576 West Fourth street, Dayton, in the county of Montgomery and State of Ohio, have invented certain new and useful Improvements in Speed-Transformers, of which I declare the following to be a full, clear, and exact description.

This invention relates to a speed transformer comprising a rotatable armature, a bodily rotatable magnetic field, and speed regulating means.

The principal object of this invention is to provide a speed transformer which when connected with a motor of constant, or approximately constant speed characteristics will deliver power like a motor of varying speed characteristics.

Another object of this invention is to construct means so that the resistance of the armature comprising one member of the speed transformer is as small as possible and so that the relative speed between the armature and the magnetic field comprising the other member of the speed transformer is as small as possible so as to obtain a condition similar to that of an induction motor near its synchronous speed.

A still further object of this invention is to provide means whereby the direction of rotation of the driven member may be reversed without stopping or changing the speed of the device employed to operate the transformer, the same means being adapted to be used for slowing down or stopping the driven member.

It is still a further object of the invention to provide a clutch device whereby when one member of the transformer has a tendency to rotate at a greater speed than the other member, which is normally rotated at the greater speed, the two members are automatically clutched together.

With these and incidental objects in view, the invention consists of certain novel features of construction and combination of parts, the essential elements of which are set forth in appended claims and a preferred form of embodiment of which is hereinafter described with reference to the drawings which accompany and form part of this specification.

Of said drawings:

Figure 1 is a top plan view of the present invention, the speed transformer being shown in horizontal section.

Fig. 2 is a sectional view taken on the line B—B of Fig. 1.

Fig. 3 is a sectional view taken on the line A—A of Fig. 1.

Fig. 4 is a detail sectional view showing the clutch adapted to connect the field and the armature together when the field tends to rotate at a greater speed than the armature.

Fig. 5 is a detail view of the brake adapted to be used to decrease the speed of the driven member or reverse its direction of rotation.

In order that the construction and operation of the mechanism comprising the present invention may be better understood a general statement concerning the principle upon which this mechanism is based and the results to be attained will be briefly described before a detailed description of the mechanism is given.

The principle upon which the speed transformer is based is as follows. If an electric armature and a magnetic field are arranged concentrically on the same shaft, the armature circuit closed and one of the members rotated while the other is held stationary or both rotated at different speeds an electromotive force is induced in the armature conductors and a torque is exerted between these two members. If one of the members is held stationary, power must be expended to rotate the other. If instead of holding one of the members stationary, it is connected to some kind of a load, this member will begin to rotate at the very moment that the relative speed between the two members is sufficient to generate an electromotive force big enough to induce currents in the armature conductors so as to give a torque large enough to move the load. In other words, one member will drag the other.

In the preferred form of embodiment disclosed herein a constant magnet field, in the form of an electro-magnet, is connected to the load and is adapted to rotate. The armature, which is preferably of the squirrel cage type, is connected to be driven by a constant speed motor independently of the field so long as no current is supplied to the field coils. It is obvious, of course, that instead of connecting the constant speed motor so that the armature is driven thereby independently of the field, the field may be connected so that it is driven independently of the armature. It also can be readily seen that a permanent magnet may be used instead of an electro-magnet. In this latter case, however, the armature circuit will have to be adapted to be opened and closed at will.
As long as no current is supplied to the field there will, of course, be no current flow in the armature conductors, and no drag exerted between the armature and the field. Under such conditions the constant speed motor may run at all times without having any effect whatever on the load. When it is desired to have the load move, it is only necessary to close the circuit to send current through the field coils and there are present conditions similar to those of an induction motor, i. e. when the primary of the induction motor is supplied with polyphase alternating currents the rotor begins to rotate.

If the constant speed motor is connected directly to one of the rotating members, for example, the armature, the relative speed between the two members would be very great and high resistance losses will occur in the armature circuits, i. e. only a small part of the power would be transmitted from the armature to the field in mechanical form, the difference being lost in the form of heat in the armature circuits.

In the present invention a system of planetary gearing is interposed between the constant speed motor, the armature and the magnetic field, so that the resistance of the armature and the relative speed between the armature and the field is made as small as possible and therefore the heat losses will be a neglible quantity. This relative speed between the armature and the field remains small, no matter how large the relative speed between the constant speed motor and the driven power receiver. In other words, while the range of speed of the power receiving shaft is from standstill to its maximum speed, the relative speed between the armature and field varies only from a small quantity to zero. While the speed of the load increases very rapidly the relative speed between the armature and the field decreases but very little and gradually until it becomes zero at the synchronous speed of the system to be defined hereinafter. In this way a characteristic is obtained similar to the characteristic of an induction motor near its synchronous speed, but extended over the whole range of speed.
Having described in general the construc-
tion of the present invention, the principle upon which it operates, and the objects to be accomplished, the specific means shown in the present illustrative form of embodiment for accomplishing these objects will now be described in detail.

A constant, or approximately constant speed motor 10 (Fig. 1) is constructed to rotate a shaft 9, upon which are rigidly mounted two gears 11 and 12. The gear 12 meshes with a gear 14 and the gear 11 meshes with a gear 13. The gear 14 is loosely mounted upon a shaft 15 which is the shaft connected to the load and adapted to be driven at a varying speed. The disk 13 is loose on a hub 20 of a disk 211. Journaled at their ends in the gears 13 and 14 are two shafts 16, each of which has rigidly mounted thereon two gears 18 and a gear 17. The gears 17 mesh with a gear 24 fast on the shaft 15 and the gears 18 mesh with corresponding gears 19, one of which is rigidly mounted on the hub 20 of the end disk 211 and the other on the hub of the other disk 200 of a squirrel cage armature 22 which is mounted to rotate on the shaft 15. The armature 22 may be of any well known type or construction, the squirrel cage armature comprising the end disks 200 and 211 and the conducting bars 23, being preferred. It is clear that it is only necessary to employ but one of the gears 11 and 12, and but one gear 17 and one gear 18 the the multiplicity and arrangement of these gears shown in the drawings being provided to strengthen the construction and lessen the strain on the various parts.

Rigidly mounted on the shaft 15 and within the armature 22 is the field comprising a core 25 with field windings 27. The field may be of any other type or form, the construction shown being for illustrative purposes only. The field windings are connected to slip rings 28 fast on the shaft 15. Current is supplied to the field windings by a small direct current generator 30, driven by the shaft 9. The current is supplied through the commutator 31 of the generator 30 and the wires 32 and brushes 33, the latter being in engagement with the slip rings 28. Of course, current may be supplied to the field windings from another source, such as a battery, if desired. The circuit through the field coils is closed by a switch 45.

From the above description, it can be seen that when the shaft 15 is held stationary, movement of the gears 13 and 14 will cause the shafts 16 to revolve and at the same time rotate, because of the meshing of the gears 17 fast on the shafts 16 with the gear 24 fast on the shaft 15. Due to the fact that the gears 17 and 18 are of different radii the armature will rotate and the speed of this rotation is dependent upon the proportion of these gears 17, 18, 19 and 24.

Letting V represent the speed of the gears 13 and 14; $R_1$, $R_2$, $R_3$ and $R_4$ represent the radii of the disks 18, 17, 19 and 24 respectively, and X represent the speed of the armature when the field is stationary, then $$X = V \frac{(1 - R_4 R_1)}{R_2 R_3}$$

Letting $$M = \frac{R_1}{R_2} \cdot \frac{R_4}{R_3}$$

$$X = V(1 - M)$$

By making M very near 1, X can be made as small as desired.

As soon as the shaft 15 begins to rotate with the speed of Z, then Y, the speed of the armature, will be $$Y = Z(M) + V(1 - M)$$

Then the relative speed between the armature and field may be expressed by the equation $$Y - Z = -Z(1 - M) + V(1 - M)$$

which is the equation of a straight line.

As the speed of the field increases Y—Z decreases correspondingly, until $$Y - Z = 0 \text{ when } Y = Z = V.$$

That is to say, the speed of the gears 13 and 14, the armature and the magnetic field are then the same. This speed may be called the synchronous speed of the system. The above equations are, of course, independent of whether the speed of the driving motor is constant or not. In fact, a variable or a varying speed motor may be used if desired. In case of a variable speed motor the system will have more than one synchronous speed.

As has been shown by selecting M very near one the relative speed between the field and armature is very small when the field is at standstill and since in accordance to the above equation the relative speed between the field and armature decreases while the speed of the field is increasing, it follows that at all speeds of the driven shaft the relative speed between the field and the armature is very small. The purpose of the planetary gearing is therefore now obvious.

It can now be seen that with the above described construction a method is attained for the transformation of a constant speed motor into a varying speed motor, that is, while the power delivered at the motor shaft 9 has constant speed characteristics the power delivered to the shaft 15 has varying speed characteristics. In other words, by the provision of this speed transformer a motor having the so-called series characteristic is obtained. It may be noted that by means of the rheostat (shown adjacent the switch 45 in Fig. 1) the current supplied to the field may be varied and the torque transmitted through the transformer may be modified as desired.

As compared with a series motor this invention has great advantages in that no external means is required for regulation. As is well known the current taken by a series motor would be prohibitively large if the line voltage would be applied directly to the motor when the latter is at a standstill. It is for this reason necessary to insert a large resistance in the armature circuit and then while the motor increases its speed gradually reduce this resistance. Should the load driven by a series motor running at normal speed be suddenly thrown off such a motor would go to pieces unless resistance be inserted in the armature circuit. In the present invention the adjustment dependent upon the speed and the load takes place automatically and without any external means. With increasing load the speed of the driven shaft 15 decreases and with decreasing load the speed of this shaft increases, but the speed of the shaft can never be greater than that of the constant speed motor unless it becomes a driving member.

It is, of course, understood that it is immaterial whether the armature is of the alternating current type or direct current type.

It is believed that the present inventor is the first in the art to provide means for automatically adjusting the relative speed between the armature and the field so that while the speed of the driven power receiver has a big range, i. e. from standstill to maximum speed, the relative speed between the armature and the field varies but little and is always very small.

Of course, normally the speed of the driven member, that is, the shaft 15, will be less than that of the constant speed motor since the operation of the speed transformer depends upon the drag between the armature and the field and there can be no drag if their relative speed is equal to zero. It is possible, however, that the driven shaft 15 may rotate at the same speed as the armature and even become the driving member which is the case when the load is a traction load, that is, when the device is employed to drive a vehicle. Such a condition would exist when the vehicle is going down grade, no external power being then necessary to drive it as it is then being driven by gravity. For such a condition means are provided for automatically clutching the drive shaft 15 and the disk 14 together so that the disk 14 operates at the same speed as the shaft 15.

This clutch in the illustrative form shown includes a disk 40 (Figs. 1 and 4) fast on the shaft 15. The disk 40 has cutaway portions 41 in which are seated rollers 42 adapted to coöperate with the inner periphery of a circular flange 43 on the driving disk 14.

Spring plungers 451 are seated in the disk 40 and coöperate with the rollers 42. These plungers tend to force the rollers 42 away from the nearly radial sides of the cutaway portions 41 so that the rollers 42 are retained in engagement with the inner periphery of the flange 43.

From this description it can be seen that when the driving disk 14 is rotated at a greater speed than the disk 40 and therefore of the shaft 15, the rotation of the disk 40 tends to move the rollers 42 toward the nearly radial edges of the cutaway portions 41 so that the rollers do not frictionally connect the disk 40 and the disk 14. When, however, the reverse condition is present, that is, when the shaft 15 and disk 40 are rotated at a greater speed than the disk 14, the rollers frictionally couple the disks 14 and 40 together so that the shaft 15 and the disk 14 are operated at the same speed.

The advantage of this automatic clutch becomes apparent when the constant or approximately constant speed motor 10 is an induction motor. As is well known from its characteristics an induction motor becomes an induction generator when operated at a speed greater that its synchronous speed. Power is then delivered back to the line. With this automatic clutch such result is obtained without any act on the part of the motorman in cases where the device is employed to drive electric cars.

In order to reverse the direction of rotation of the shaft 15 without reversing the constant speed motor, it is only necessary to apply a brake to the armature. This brake may be of any desired construction, the one shown in the drawings being used for illustration. This brake comprises a disk 50 fast on the hub 20 of the disk 211 of the armature. A metal ribbon 51 is mounted in a groove 52 of the disk 50, one end of the ribbon being connected to the stud 53 constituting a fulcrum for a lever 54. The opposite end of the ribbon is connected to the lever 54 at 55.

It has been seen that when the switch 45 is not closed and the constant speed motor 10 is operated the armature is driven at a certain speed expressed by the equation $$X = V(1-M)$$

If, however, the armature instead of the field is held stationary while the switch is open the constant speed motor through the planetary system will rotate the field and shaft 15 in the reverse direction, and the speed of this rotation will be $$V\frac{(1-M)}{M}$$

When the switch is opened and the brake applied to the armature, it is obvious that when M is made smaller than one the armature and the driven shaft begin to slow down until the speed of the armature has become again $$V(1-M)$$

when the driven member or the field will come to a standstill. By continued application of the brake the speed of the armature will be further decreased and the field rotated in the reverse direction until the latter reaches its maximum speed of $$V\frac{(1-M)}{M}$$

when the armature will have come to a standstill.

It is understood of course, that the provision of a brake to effect this result is of particular advantage in motor cars, the lever 54 being adapted to be operated through any desired means by the operator.

While the form of mechanism herein shown and described, is admirably adapted to fulfil the objects primarily stated, it is to be understood that it is not intended to confine the invention to the one form of embodiment in various forms, all coming within the scope of the claims which follow.

What is claimed is:

1. The combination with a rotatable armature and a bodily rotatable magnetic field, adapted to drag each other due to currents induced in the armature, of a gear wheel fast to the magnetic field, a gear wheel fast to the armature, a device rotated at a constant speed and two gear wheels carried by said device and meshing with the gear wheels fast to the armature and the field, the intermeshing gears being of such ratio as to automatically maintain the relative speed between the armature and the field always less than that between the field and the device except when both relative speeds become zero.

2. The combination with a rotatable armature and a bodily rotatable field adapted to drag each other due to currents induced in the armature, of a member rotated at a constant speed, a shaft carried by said member, two gears fast on said shaft, a gear fast to the armature meshing with one of said gears on the shaft, a gear fast to the field meshing with the other gear on the shaft the ratio of said gears being such that the relative speed between the armature and the field is always less than that between the field and the member except when both relative speeds become zero.

3. The combination with a rotatable armature and a bodily rotatable field adapted to drag each other due to currents induced in the armature, of a member rotated at a constant speed, a shaft carried by said member, two gears fast on said shaft, a gear fast to the armature meshing with one of said gears on the shaft, a gear fast to the field meshing with the other gear on the shaft, the ratio of said gears being such that the relative speed between the armature and field is always maintained less than that between said member and the field while both relative speeds are being reduced according to the decrease of the load, except when relative speeds become zero.

4. In a speed transformer the combination with a rotatable armature and a bodily rotatable magnetic field adapted to drag each other due to currents induced in the armature, the speed of one being normally less than that of the other, of means for automatically coupling said armature and said field together when a tendency as to the reverse condition as to the speed of the two exists.

5. In a speed transformer the combination with a rotatable armature and a bodily rotatable magnetic field adapted to drag each other due to currents induced in the armature, the speed of one being normally less than that of the other, of a frictional clutch device for automatically coupling said armature and said field together when a tendency as to the reverse condition as to the speed of the two exists.

6. In a speed transformer the combination with a rotatable armature and a bodily rotatable magnetic field adapted to drag each other due to currents induced in the armature, the speed of one being normally less than the speed of the other, means for automatically controlling in accord to the load the change in the relative speed between the armature and the field, and means for automatically coupling said armature and said field together when the one normally rotated at less speed than the other tends to rotate at a greater speed than the other.

7. In a device of the class described, the combination with a bodily rotatable armature and a bodily rotatable electro-magnetic field, adapted to drag each other due to currents induced in the armature the rotation of the armature being normally greater than that of the field, of means for automatically controlling the change in the relative speed between said field and armature in accordance with the load when the field is energized, a device for coupling said field and armature together when the speed of the field becomes greater than that of the armature, and mechanism for reducing the speed of the armature when the field is not energized to cause said automatic means to reverse the direction of rotation of the field.

8. In a device of the class described, the combination with a bodily rotatable armature and a bodily rotatable electro-magnetic field, adapted to drag each other due to currents induced in the armature the rotation of the armature being normally greater than that of the field, of means for automatically controlling the change in the relative speed between said field and armature in accordance with the load when the field is energized, a device for coupling said field and armature together when the speed of the field becomes greater than that of the armature, and mechanism for reducing the speed of the armature when the field is not energized to cause said automatic means to reduce the speed of and reverse the direction of rotation of the field as desired.

9. The combination with a constant speed motor, of a speed transformer comprising a rotatable armature and a bodily rotatable field one of which is rotated due to currents induced in the armature, a device operated by the constant speed motor, a system of planetary gearing interposed between said device and the armature and field for automatically controlling in accordance to the load the relative speed between the armature and field and so constructed that the relative speed between the armature and the field is always less than that between the one, rotated due to currents induced in the armature and said device except when both relative speeds become zero, and means for automatically coupling said armature and field together when the one rotated due to the induced currents tends to rotate faster than the other.

10. The combination with a rotatable armature and a bodily rotatable magnetic field, adapted to drag each other due to currents induced in the armature, of a gear wheel fast to the magnetic field, a gear wheel fast to the armature, a rotating device, and two gear wheels carried by said device and meshing with the gear wheels fast to the armature and the field, the intermeshing gears being of such ratio as to automatically maintain the relative speed between the armature and the field always less than that between the field and the device except when both relative speeds become zero.

11. In a speed transformer the combination with a rotatable armature and a bodily rotatable magnetic field adapted to drag each other due to currents induced in the armature, of a driven member connected to the field, driving mechanism, a device connected to said driving mechanism, means for automatically maintaining the relative speed between the armature and field always smaller than the relative speed between the field and said device except when both relative speeds become zero, and means for automatically coupling said armature and said field together when the field tends to run faster than the armature.

12. The combination of two members, that is, a rotatable armature and a bodily rotatable magnetic field adapted to drag each other due to currents induced in the armature, a gear wheel fast to each member, a rotated device, two gear wheels carried by said device and meshing with said gear wheels fast to said members, the intermeshing gears being of such ratio as to automatically maintain the relative speed between said two members always less than that between one of said members and the device except when both relative speeds become zero.

13. The combination of two members, that is, a rotatable armature and a bodily rotatable magnetic field adapted to drag each other due to currents induced in the armature, a driven element connected to one of said members, a gear wheel fast to each member, a rotated device, two gear wheels carried by said device and meshing with said gear wheels fast to said members, the ratio of said gears being such that the relative speed between said two members is always maintained less than that between said device and the member connected to the driven device while both relative speeds are being reduced according to the decrease of the load, except when both relative speeds become zero.

14. The combination of two members, that is, a rotatable armature and a bodily rotatable magnetic field adapted to drag each other due to currents induced in the armature, one of said members being normally rotated faster than the other one, a gear wheel fast to each member, a rotated device, two gear wheels carried by said device and meshing with said gear wheels fast to said members, the intermeshing gears being of such ratio as to automatically maintain the relative speed between said two members always less than that between one of said members and the device except when both relative speeds become zero, and means for automatically connecting said two members together when the one normally rotated at a lower speed tends to rotate faster than the other member.

15. The combination of two members, that is, a rotatable armature and a bodily rotatable magnetic field adapted to drag each other due to currents induced in the armature, a gear wheel fast to each member, a rotated device, two gear wheels carried by said device and meshing with said gear wheels fast to said members, the intermeshing gears being of such ratio as to automatically maintain the relative speed between said two members always less than that between one of said members and the device except when both relative speeds become zero, and means for reducing the speed of one member whereby said gears cause the other member to reverse its direction of rotation.

In testimony whereof I affix my signature.

MAXIMILIAN M. GOLDBERG.

Copies of this patent may be obtained for five cents each, by addressing the "Commissioner of Patents, Washington, D. C."